Figure 1:
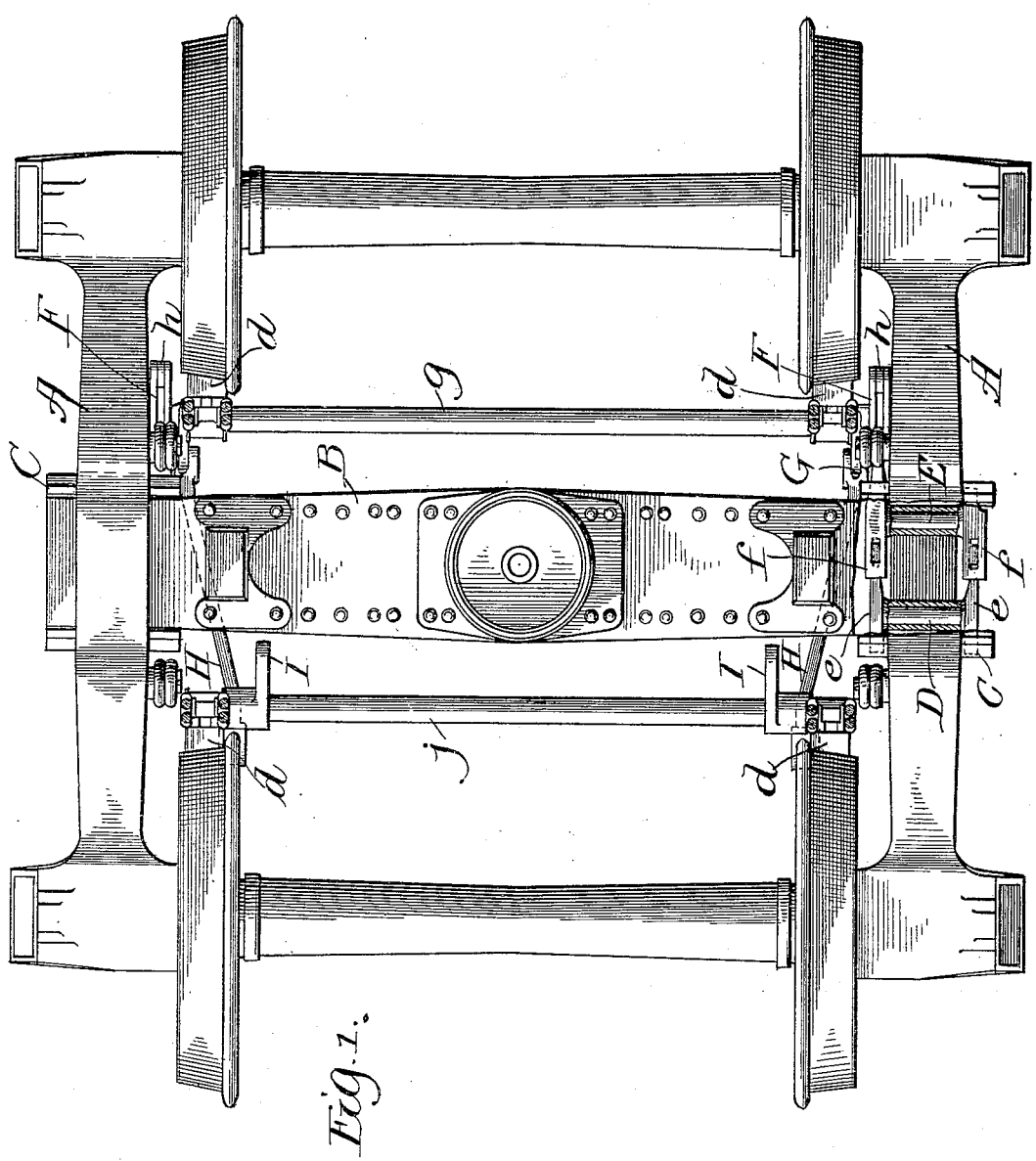

W. G. RANSOM.
BRAKE POWER LIMITING APPARATUS.
APPLICATION FILED SEPT. 21, 1908.

961,257. Patented June 14, 1910.

3 SHEETS—SHEET 1.

Witnesses

Inventor
Willard G. Ransom
by Frank D. Thomason
Atty

W. G. RANSOM.
BRAKE POWER LIMITING APPARATUS.
APPLICATION FILED SEPT. 21, 1908.
961,257.
Patented June 14, 1910.
3 SHEETS—SHEET 2.
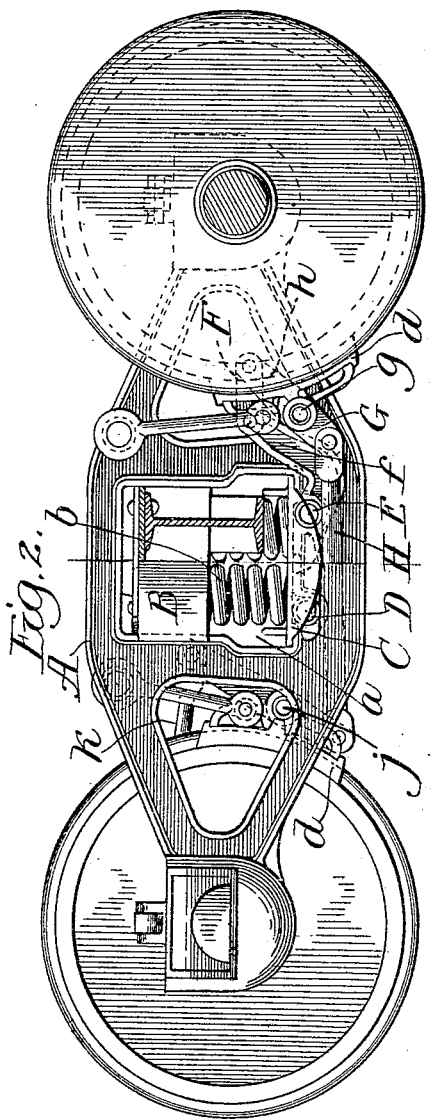
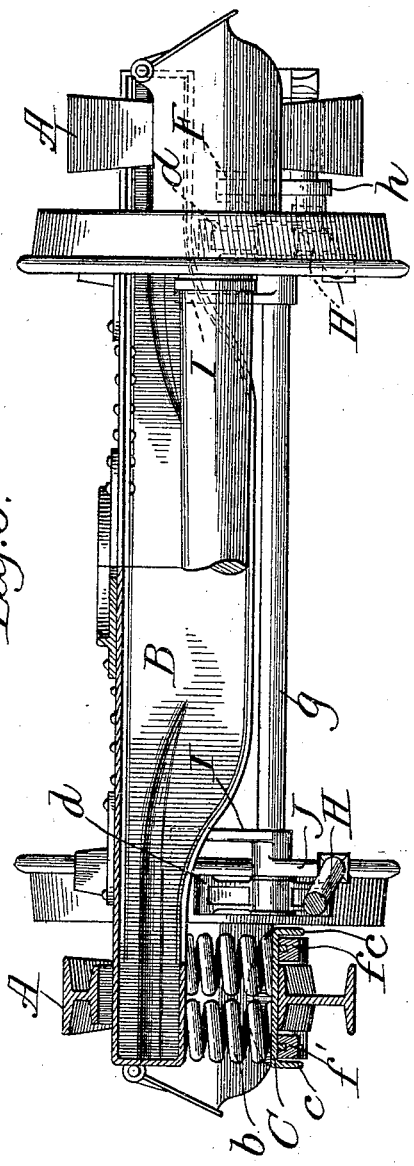
Witnesses:
Inventor
Willard G. Ransom
by Frank D. Thomason
Atty W. G. RANSOM.
BRAKE POWER LIMITING APPARATUS.
APPLICATION FILED SEPT. 21, 1908.
961,257.
Patented June 14, 1910.
3 SHEETS—SHEET 3.
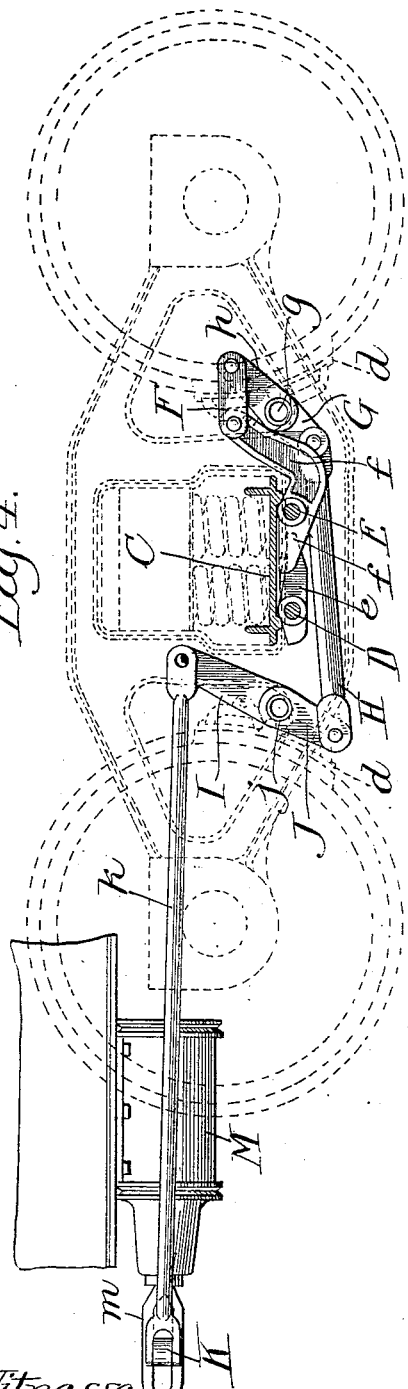
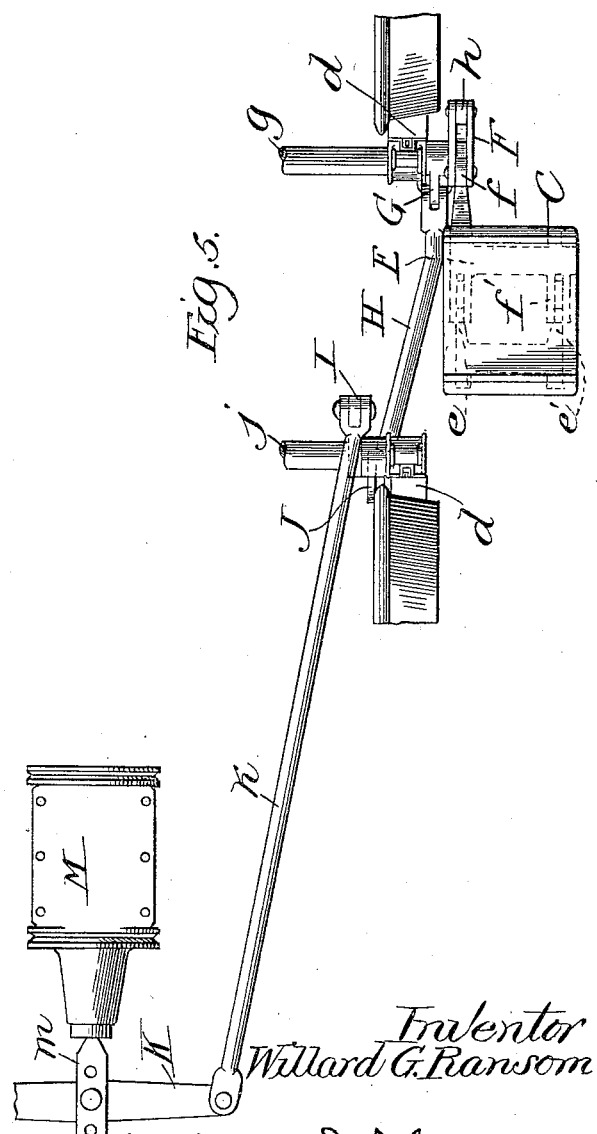
Inventor
Willard G. Ransom
By Frank D. Thomason
Atty

UNITED STATES PATENT OFFICE.

WILLARD G. RANSOM, OF DAVENPORT, IOWA.

BRAKE-POWER-LIMITING APPARATUS.

961,257.  Specification of Letters Patent. Patented June 14, 1910.

Application filed September 21, 1908. Serial No. 453,997.

*To all whom it may concern:*

Be it known that I, WILLARD G. RANSOM, a citizen of the United States, and a resident of Davenport, in the county of Scott and State of Iowa, have invented certain new and useful Improvements in Brake-Power-Limiting Apparatus, of which the following is a clear, full, and exact description.

In operating passenger trains, it is very desirable, especially in cases of extreme danger, to quickly exert the maximum braking power, but, up to date, for practical reasons, on freight service, it has been deemed advisable to limit the braking power to an amount equal to some predetermined percentage of the weight of the car, *per se*, and, since a brake power, of a given amount cannot stop a loaded car as quickly as it can an empty car, it is desirable to provide an increase of brake power for loaded cars, which, or a percentage of which (within certain limits) will automatically be exerted according to the weight of the load being carried by said car and thus avoid the danger of sliding wheels, due to excessive braking pressure.

The object of my invention is to apply to brake equipments of any of the well known and extensively used types, of brake actuating mechanism, having the power to produce a braking pressure in excess of the weight of the car, *per se*, means, whereby excessive force applied to the brake shoes may become balanced with the weight of certain parts of the car-truck and the superposed car-body, and thus limit the force it is possible to exert on the brake-shoes, so that it will not exceed in extent a predetermined percentage of the weight of the aforesaid car and its load.

A further object of my invention is to provide means whereby the limit of braking power obtainable is determined for each individual car together with the load carried thereby, without affecting the brake power utilized in any other car of the same train.

A still further object of my invention is to provide means whereby the brake power for each car-truck of any given car is automatically determined independently of the other truck thereof, according to the amount of the load bearing upon and sustained by said truck.

Yet another object of my invention is to provide means whereby the aforesaid limit of braking pressure for each car, and each truck of each car, will be constant for a given load, irrespective of any increase of pressure in the air-brake pipe system, over and above that pressure for which the apparatus is designed, when the customary air-brake system is used as the braking mechanism.

These and other desirable objects are accomplished by my improved apparatus, by the means hereinafter fully described, and as more particularly pointed out in the claims.

In the drawings: Figure 1 is a plan view of my invention. Fig. 2 is a side view of the same showing one-half of said truck in elevation, and the other half in longitudinal vertical section. Fig. 3 is an end view of the same showing one half in vertical transverse section and the other half in elevation. Fig. 4 is a diagrammatical view showing the principal parts of my invention and the actuating cylinder of the air-brake system in side elevation. Fig. 5 is a plan view of the same.

My invention is adapted for use in connection with any suitable car-truck, and particularly one employing side-frames A having bolster-openings $a$ therein, and a truck bolster B the ends of which enter said bolster-opening and rest upon and are supported by the springs $b$. In the drawings I have shown the side-frames A made in one piece, and the lower portion of the bolster-opening slightly wider than the upper portion, but this is not essential. The springs $b$ are seated on a vertically vibratory tray C, which rests upon the flanged sill of the bolster-opening $a$, and corresponds in width to the lower portion of the same. The dimensions of this tray in the direction of the length of the bolster exceeds the depth of the flanged sill of said bolster-opening, and overhangs the outer and inner edges thereof, and its outer and inner edges are parallel and flanged downward a suitable distance to form aprons $c$, $c$, that guard the means for lifting the tray when excessive force is applied to throw the brake-shoes $d$ into engagement with the car-wheels. These means comprise two short transverse rock-shafts D and E, that are journaled in bearings in the side-frames; one under one end of the bolster-opening and the other under the other end of the same. The ends of these rock-shafts extend slightly beyond their bearings and have secured thereto, behind aprons c of the tray, horizontally disposed rock-bars, e and e', and f, f'. Rockshaft D has rock-bars, e and e' secured to its ends, and the branches of these rock-bars projecting toward rock-shaft E, extend beyond the center of width of the tray, and are longer than the branches projecting diametrically opposite therefrom. These longer branches of rock-bars, e and e', extend under the corresponding branches of rock-bars f and f' secured to and projecting from the ends of rock-bar E, but the opposite branch of the innermost of these last mentioned rock-bars, to wit: f, extends upward a slight distance above the plane of the brake-beam, g, and gives said bar sort of an L-shape, and is connected by a horizontally disposed link F to the upper end of an arm h projecting up from the end of the brake-beam g. An arm, G, projects downward from the end of said brake-beam, preferably, from the boss of arm h, and the lower end of this arm, G, is connected by means of a link H, to the lower end of an arm, J, projecting down from the ends of the brake-beam j engaging the car-wheels opposite those engaged by the brake-shoes on brake-beam, g. Projecting upward, preferably, diametrically opposite arm J, is an arm I, whose upper end is connected by a connecting rod k to a transverse lever K fulcrumed at its center of length to the outer end of a piston m of the longitudinally disposed air-cylinder M.

In operation, when the air enters the cylinder, and the piston moves toward the limit of its outward throw, connecting-rod k causes the brake-shoes of brake-beam j to engage the periphery of the car wheels nearest said cylinder and at points about diametrically opposite the same, and, through the medium of link H, causes the brake-shoes, carried by brake-beam g to engage the car-wheels farthest from said cylinder. Now, the extent of the braking power for each truck is determined in various ways, but I have adopted the simple expedient of making the fulcrum of the lever K adjustable in any of the series of openings in the clevis formed in the outer end of the piston of the air-cylinder. The exact braking power for each truck having been predetermined, when the air pressure exceeds this limit, the brake-levers will rotate slightly more than is necessary to throw the brake-shoes into engagement with the car wheels at their maximum pressure, and, by means of arm h, link F and rock-bar f, rock-shafts, E and D will be rotated in such direction that the short branches of the rock-bars f and f', and e and e', will move upward and lift the tray C and compress the springs b b upwardly against the ends of the bolsters. If the car-body is empty the resistance offered to the lifting of the trays will naturally, be less than when the car is loaded, and it is apparent that this resistance is graduated just according to the load carried by the car. Thus, if the air pressure (which should exceed that required to effectively operate the brakes) is the same at all times in the cylinder, the pressure of the brake-shoes against the car wheels, will be determined by the load on the trays C, and the braking-power for a heavily laden car will be greater than for a light running car. Should the air-pressure in the cylinder still be greater than is necessary, after the limit of elevation of the trays has been reached, the resistance to any additional effort of said air-pressure would simply result in the compression of the air in the cylinder. In other words the upward movement of the trays C permits the piston of the air-cylinder to move to the end of its stroke in which position the excessive air pressure becomes inoperative.

What I claim as new is:—

1. A brake power limiting mechanism comprising a suitable car-truck having a bolster, springs therefor, trays for said springs, rock-shafts journaled transversely under each end of said trays, rock-bars secured to the ends of said shafts and adapted to vibrate said trays vertically, and means for actuating said rock-bars.

2. A brake power limiting mechanism comprising a suitable car-truck having a bolster, springs therefor, trays for said springs, rock-shafts journaled transversely under each end of said trays, rock-bars secured to the ends of said shafts arranged so that the rock-bars of one shaft project toward and overlap those of the other, and are adapted to vibrate said trays vertically, and means for actuating said rock-bars.

3. A brake power limiting mechanism comprising a suitable car-truck having a bolster, springs therefor, trays for said springs, rock-shafts journaled transversely under each end of said trays, rock-bars secured to the ends of said shafts one of which is substantially L-shaped, a brake-beam, and arm projecting therefrom, link connecting the vertical branch of said L-shaped rock-bar and said arm, and means for moving said brake-beam so as to actuate said rock-bars.

4. In a brake power limiting apparatus, a car-truck comprising side-frames and a truck-bolster, brake-beams and shoes adapted to engage the wheels thereof, power imparting devices for actuating the same, and unyielding means connecting said brake-beams, in combination with mechanism en train after the second brake-beam affected by said power devices and interposed between the same and said truck bolster, to utilize the surplus power of said devices to lift said bolster.

5. In a brake power limiting apparatus, a car-truck, brake-beams and shoes adapted to engage the wheels thereof, brake-power imparting devices, and unyielding means connecting said brake-beams, in combination with rock-bars having their axes arranged parallel to the length of the bolster of the truck and interposed between the second brake-beam affected by said power devices and the bolster, to utilize the surplus power of said devices to lift said bolster.

6. In a brake-power limiting apparatus, a car-truck comprising side-frames, and a truck-bolster, brake-beams and shoes adapted to engage the wheels thereof, brake-power imparting devices including the live and dead brake-levers, and inflexible means directly connecting said levers, in combination with rock-bars supported by the side-frame of said truck and having their axes arranged transverse thereto and actuated to lift said truck-bolster by the excess of power remaining after the effective maximum braking-pressure has been exerted against the wheels.

7. In a brake-power limiting apparatus, a car-truck comprising side-frames and a truck-bolster, rotatable brake-beams, shoes carried thereby adapted to engage the wheels of said truck, power imparting devices including live and dead brake-levers for actuating said brake-beams, in combination with mechanism located under the ends of said truck-bolster and actuated by the dead brake-lever to utilize the surplus power remaining after the maximum effective brake-pressure has been exerted by the brake-shoes against the wheels of the truck to lift said truck-bolster.

8. In a brake power limiting apparatus, a car-truck comprising side-frames, having bolster-openings therein, and a bolster, brake-beams one of which has an arm projecting therefrom, and shoes adapted to engage the wheels of said truck, power imparting devices for actuating said brake-beams, and means connecting the latter, in combination with rock-bars pivotally supported by said side-frames under said bolster and having their axes transverse to said side-frames, and a link connecting one of said rock-bars to said brake-beam arm.

9. In a brake power limiting apparatus, a car-truck comprising side-frames having bolster openings therein, and a bolster, rotatable brake-beams one of which has an arm projecting therefrom, and shoes adapted to engage the wheels of said truck, power imparting devices for actuating said brake-beams, and means connecting the latter, in combination with rock-bars pivotally supported by said side-frames under said bolster and having their axes transverse to said side-frames, and a link connecting one of said rock-bars to said brake-beam arm.

In testimony whereof I have hereunto set my hand and seal this 15th day of August, A. D., 1908.

WILLARD G. RANSOM. [L. S.]

Witnesses:
J. L. GODDARD,
F. M. GODDARD.